United States Patent
Nanri et al.

(10) Patent No.: US 8,046,149 B2
(45) Date of Patent: Oct. 25, 2011

(54) BRAKE APPARATUS FOR VEHICLE, AND METHODS OF USING SAME

(75) Inventors: Takehiko Nanri, Saitama (JP);
Sumitaka Ogawa, Saitama (JP);
Kazuya Takenouchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 484 days.

(21) Appl. No.: 12/322,103

(22) Filed: Jan. 29, 2009

(65) Prior Publication Data

US 2009/0216416 A1    Aug. 27, 2009

(30) Foreign Application Priority Data

Feb. 27, 2008   (JP) ................................ 2008-046024

(51) Int. Cl.
*B60T 7/12* (2006.01)
*B60T 8/60* (2006.01)

(52) U.S. Cl. ................. 701/78; 701/70; 701/71; 701/83

(58) Field of Classification Search ............ 701/78, 701/70, 71, 83; 303/3, 15, 19.1, 155, 157, 303/DIG. 1, DIG. 2
See application file for complete search history.

(56) References Cited

U.S. PATENT DOCUMENTS

| | | | |
|---|---|---|---|
| 7,841,671 B2 * | 11/2010 | Nakayama et al. | 303/9.64 |
| 7,887,145 B2 * | 2/2011 | Niino et al. | 303/113.4 |
| 2007/0208481 A1 * | 9/2007 | Maki et al. | 701/70 |
| 2011/0108375 A1 * | 5/2011 | Wuerth et al. | 188/106 P |
| 2011/0160972 A1 * | 6/2011 | Crombez et al. | 701/70 |

FOREIGN PATENT DOCUMENTS

JP    2006-193136    7/2006

* cited by examiner

*Primary Examiner* — Paul N Dickson
*Assistant Examiner* — Marlon Arce
(74) *Attorney, Agent, or Firm* — Carrier Blackman & Associates, P.C.; Joseph P. Carrier; William D. Blackman

(57) ABSTRACT

A brake apparatus includes first, second and third solenoid valves (hereinafter SOL1, SOL2 and SOL3) respectively disposed in a first branch pipe, a second branch pipe, and a main pipe connecting a master cylinder and a brake caliper. The brake apparatus also includes first, second and third pressure sensors (hereinafter P1, P2 and P3) respectively disposed between the master cylinder and the SOL3, between the SOL1 and a fluid loss simulator, and between the SOL2 and the hydraulic pressure modulator. The brake apparatus further includes a control unit for detecting output values of P1, P2 and P3. A resolution of P2 is set at a value greater than resolutions of P1 and P3. With SOL1 in an opened state, when detected output value of P2 is less than a predetermined value, the control unit stores output values from the respective pressure sensors as reference values.

20 Claims, 4 Drawing Sheets

BRAKE APPARATUS FOR VEHICLE, AND METHODS OF USING SAME

CROSS-REFERENCE TO RELATED APPLICATIONS

The present application claims priority under 35 USC §119 based on Japanese patent application No. 2008-046024, filed on Feb. 27, 2008. The entire subject matter of this priority document, including specification, claims and drawings, is incorporated by reference herein.

BACKGROUND OF THE INVENTION

1. Field of the Invention

The present invention relates to a brake apparatus for a vehicle, and to a method of using the described apparatus. More particularly, the present invention relates to a brake apparatus and method in which accuracy of zero-point corrections of multiple pressure sensors, provided in a brake pipe path, is improved.

2. Description of the Background Art

There is a known a hydraulic brake apparatus having the following configuration employed in vehicles such as motorcycles. Specifically, in the known hydraulic brake device, an input side in which hydraulic pressure is generated by a rider performing a brake operation, and an output side in which the hydraulic pressure is applied to a brake caliper so as to brake (to stop rotation of) a wheel, are connected to and disconnected from each other by a solenoid valve.

The Japanese Patent Application Publication No. 2006-193136 discloses a brake apparatus in which a master cylinder which generates hydraulic pressure in conjunction with the operation of a brake lever is connected to a brake caliper which generates a brake force with the hydraulic pressure supplied thereto, by a brake path including a normally-open solenoid valve, and in which a hydraulic modulator which generates hydraulic pressure in an actuator is connected to a brake caliper side by the solenoid valve. The brake apparatus of this type is configured, when a brake operation force is detected by the pressure sensor, to close the normally-open solenoid valve and perform drive control of the hydraulic modulator based on an output value from the pressure sensor so that the brake caliper generates a brake force.

In order to appropriately control such brake devices, multiple sensors are necessary to detect the pressure in a hydraulic pressure passage. In the configuration as disclosed in the Japanese Patent Application Publication No. 2006-193136, two input side pressure sensors and one output side pressure sensor are provided.

In the configuration in which the drive control of the brake apparatus is performed based on the output values of the multiple pressure sensors as described in the Japanese Patent Application Publication No. 2006-193136, it is preferable to have high resolution pressure sensors on the input side which detects the brake operation force by the rider, in particular. When the high resolution pressure sensors are provided, the accuracy of the brake control can further be improved by performing a correction of adjusting the zero points of the other pressure sensors to that of the high resolution pressure sensor.

However, the pressure sensor tends to decrease in pressure resistance when the resolution is improved, which in turn causes a problem that the high resolution pressure sensor should not be arranged in a place where there is a possibility of an excessive hydraulic pressure being generated. In the configuration described in the Japanese Patent Application Publication No. 2006-193136, a structural arrangement to cope with the problem, appropriate steps of the zero-point correction, and the like have not been taken into consideration.

The present invention has been made to overcome such drawbacks of existing hydraulic brake apparatus. Accordingly, it is one of the objects of the present invention to solve the problem of the related art described above, and to provide a brake apparatus for a vehicle in which the accuracy of the zero-point corrections of multiple pressure sensors provided to a brake pipe path can be improved.

SUMMARY OF THE INVENTION

In order to achieve the above objects, the present invention according to a first aspect thereof provides a brake apparatus for a vehicle having a master cylinder which generates hydraulic pressure according to a brake operation force; a brake caliper which is connected with the master cylinder via a main pipe; a fluid loss simulator which is connected to an end portion of a first branch pipe branched from the main pipe.

The brake apparatus according to the first aspect of the present invention further includes a first solenoid valve which is normally closed and is provided in the middle of the first branch pipe to connect or disconnect the master cylinder the fluid loss simulator; a hydraulic modulator which is connected to an end portion of a second branch pipe branched from the main pipe on the brake caliper side with respect to the first branch pipe and which supplies hydraulic pressure generated by a driving force of an actuator to the brake caliper; a second solenoid valve which is normally closed and is provided in the middle of the second branch pipe to connect or disconnect the hydraulic modulator and the brake caliper; and a third solenoid valve which is normally open and is provided in the middle of the main pipe to connect or disconnect the master cylinder and the brake caliper.

The brake apparatus according to the first aspect of the present invention also includes a first pressure sensor which is provided on the main pipe between the master cylinder and the third solenoid valve; a second pressure sensor which is provided on the first branch pipe between the first solenoid valve and the fluid loss simulator; a third pressure sensor which is provided on the second branch pipe between the second solenoid valve and the hydraulic modulator; and a control unit for detecting output values of the first, second, and third pressure sensors.

The brake apparatus for a vehicle according to the first aspect of the present invention is characterized in that a resolution of the second pressure sensor is set to be higher than resolutions of the first and third pressure sensors; that the control unit energizes the first solenoid valve to make it into an opened state of the first solenoid valve, detects the output value of the second pressure sensor, and, executes, when the output value is smaller than a predetermined value, a zero-point correction by storing the respective output values of the first, second, and third pressure sensors as zero points, i.e., reference values, of the respective sensors.

The present invention according to a second aspect thereof is characterized in that the control unit closes the first solenoid valve when the output value of the second pressure sensor becomes greater than or equal to the predetermined value.

The present invention according to a second aspect thereof is characterized in that the zero-point correction is executed when a main power supply of the vehicle is turned on.

The present invention according to a second aspect thereof is characterized in that the vehicle is a motorcycle, and the brake apparatus is provided separately and independently to each of front and rear wheels of the motorcycle.

Effects of the Invention

According to the first aspect of the present invention, the brake apparatus is configured such that the hydraulic pressure generated in the master cylinder is not inputted to the second pressure sensor unless the normally closed first solenoid valve is energized to be brought to the opened state. Therefore, even when an excessive hydraulic pressure is generated in the master cylinder, the second pressure sensor can be protected as long as the first solenoid valve is in the closed state.

Such configuration allows the second pressure sensor to be used with a high resolution, and thus the detection accuracy of the hydraulic pressure generated in the master cylinder can be improved. Further, by performing the zero-point corrections of the first and third pressure sensors with the output value of the second pressure sensor as the reference, the accuracy of the zero-point corrections can be improved.

According to the second aspect of the present invention, the control unit closes the first solenoid valve when the output value of the second pressure sensor becomes greater than or equal to the predetermined value. Therefore, it can be determined that the brake operation is being performed by the rider so that the zero-point correction is cancelled when there is an input greater than the predetermined value to the master cylinder.

According to the third aspect of the present invention, the zero-point corrections are executed when the power supply of the vehicle is turned on, whereby the respective pressure sensors can be updated to the optimal states every time the vehicle is used.

According to the fourth aspect of the present invention, the vehicle is a motorcycle, and the brake apparatus is provided separately and independently to each of front and rear wheels of the motorcycle. Accordingly, each of the front and rear wheels of the motorcycle are able to include the brake apparatus which executes the zero-point corrections of the multiple pressure sensors based on the output value of the pressure sensor having the high resolution.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures considered necessary for illustrating selected illustrative embodiments of the present invention are described herein. Other conventional structures, and those of ancillary and auxiliary components of the system, will be known and understood by those skilled in the art.

Figure 1:
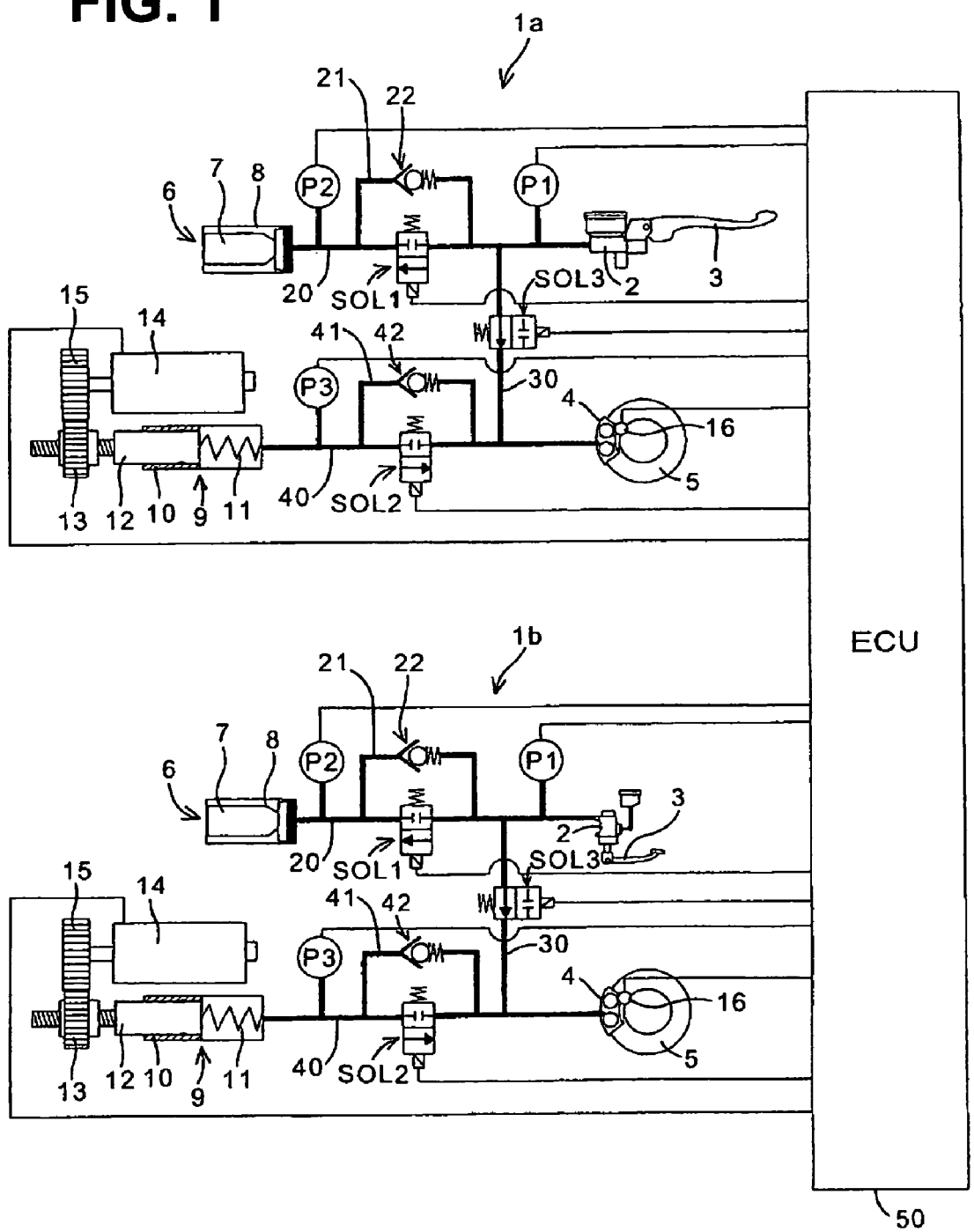
FIG. 1 is a block diagram showing a configuration of a brake apparatus for a vehicle according to an illustrative embodiment of the present invention.

Hereinafter, an illustrative embodiment of the present invention is described with reference to the drawings. FIG. 1 is a block diagram showing a configuration of a brake apparatus for a vehicle according to an illustrative embodiment of the present invention. The brake apparatus applied to a motorcycle has a configuration in which a brake circuit 1a on a front wheel and a brake circuit 1b on a rear wheel are independent from each other, and are driven by an ECU 50 as control unit. A front wheel brake operation by the rider is executed by gripping a brake operation member (brake lever) 3 attached to a handle bar (not shown) on the front wheel, and a rear wheel brake operation is executed by stepping on the brake operation member (brake pedal) 3 attached to an footrest (not shown).

Since configurations of brake operation members for front wheel side and rear wheel side are same, only the front wheel side of the brake apparatus is described below. For the rear wheel side, the same portions are denoted by the same reference numerals as in the front wheel side, and the description thereof is omitted.

The brake circuits 1a and 1b have hydraulic configurations in which brake calipers 4 are activated by the pressures transmitted by operating fluid (brake fluid). The brake circuits 1a and 1b employ a so-called brake-by-wire system. In the brake-by-wire system, operating the brake operation member (brake lever or brake pedal) 3 allows the hydraulic pressures generated in a master cylinder 2 to be detected by a predetermined pressure sensor rather than to be directly supplied to the brake caliper 4. Based on an output value from the pressure sensor, a hydraulic pressure modulator 9 is driven, which in turn activates the brake caliper 4.

It may be noted that, the brake apparatus according to the illustrative embodiment can be activated as a so-called dual combined brake apparatus in which an operation on one side of the front and rear wheels automatically causes the other side to be activated. Also, regardless of an operation by the rider, the brake apparatus according to this illustrative embodiment has an anti-lock brake system (ABS) function in which an applied brake force is instantaneously and intermittently released to prevent a locked wheel.

Further, the brake apparatus is provided with a fail-safe function by which a passage is switched so that the hydraulic pressure generated by the master cylinder 2 is directly supplied to the brake caliper 4 in order to enable a normal brake operation, when a failure has occurred in the hydraulic pressure modulator 9 or the like.

The brake caliper 4 is configured to press a brake pad (not shown) as a friction body against a brake disk 5 to generate a friction therebetween when the hydraulic pressure is supplied from the hydraulic pressure modulator 9 to the brake caliper 4. The friction gives a brake force to the wheel rotating integrally with the brake disk 5, and decelerates the vehicle. The brake caliper 4 is provided with a speed sensor 16 for detecting the speed of the motorcycle by the rotary speed of the wheel.

The master cylinder 2 and the brake caliper 4 are connected by a main pipe 30 provided with a normally open (NO-type) third solenoid valve SOL3. Note that, in the descriptions below, the master cylinder 2 side is called the input side of the brake circuit and the other side, i.e., brake caliper 4 side, is called the output side of the brake circuit with the provided position of the third solenoid valve SOL3 as the boundary. In other words, the third solenoid valve SOL3 defines is disposed at a boundary between the input side and the output side of the brake circuit.

A first branch pipe 20 is connected to the main pipe 30 on the input side with respect to the third solenoid valve SOL3. A fluid loss simulator 6 is connected the first branch pipe 20 via a normally closed (NC-type) first solenoid valve SOL1. When the third solenoid valve SOL3 is in the on-state to close the main pipe 30, the fluid loss simulator 6 causes a pseudo hydraulic reaction force according to the operated amount of the brake operation member 3 to be applied to the master cylinder 2. The first solenoid valve SOL1 opens the first branch pipe 20 at the time of the brake operation by the rider, and connects the master cylinder 2 with the fluid loss simulator 6.

The fluid loss simulator 6 has a resin spring 7 provided as an elastic member on the rear side of a hydraulic piston stored slidable in a cylinder 8. The fluid loss simulator 6 generates a hydraulic reaction force in the master cylinder 2 by a snapping force of the resin spring 7, when the hydraulic pressure by the master cylinder 2 is supplied from the first branch pipe 20. Accordingly, an operation reaction force is generated in the brake operation member 3 whereby an operational feeling according to the brake operation force can be provided to the rider.

It may be note that the elastic member provided to the fluid loss simulator 6 may be a metal spring or the like. Further, by combining elastic members with different snapping forces or the like, the relation of the stroke amount and the operation reaction force of the brake operation member 3 can be adjusted as needed.

The first branch pipe 20 is provided with a bypass path 21 which bypasses the first solenoid valve SOL1. The bypass path 21 is provided with a check valve 22 which allows the flow of the operating fluid from the fluid loss simulator 6 side toward the master cylinder 2.

A second branch pipe 40 is connected to the main pipe 30 on the output side with respect to the third solenoid valve SOL3. The hydraulic pressure modulator 9 is connected to the second branch pipe 40 via a normally closed (NC-type) second solenoid valve SOL2. The hydraulic pressure modulator 9 generates the hydraulic pressure to be supplied to the brake caliper 4, by pressing a hydraulic piston 12 inside the cylinder 10 with use of the driving force of a motor 14 as an actuator.

As the rotational drive of the motor 14 of the hydraulic pressure modulator 9 is performed by a drive instruction from the ECU 50, the rotational drive of a drive gear 15 and a driven gear 13 meshing therewith is performed. A feed screw mechanism which converts a rotational motion to a linear motion is provided between the driven gear 13 and a piston 12. With this configuration, an optional hydraulic pressure can be generated in the second branch pipe 40 by rotating the motor 14 in a predetermined direction with an electric current value determined by a predetermined duty cycle.

A return spring 11 is provided inside the cylinder 10 for providing a snapping force directing the piston 12 back to the initial position. The piston 12 may be returned to the initial position by causing a reverse rotation of the motor 14. The piston 12 may also be configured to be returned to the initial position by use of the snapping force of the return spring 11, even without driving the motor 14.

The second branch pipe 40 is provided with a bypass path 41 which bypasses the second solenoid valve SOL2, and the bypass path 41 is provided with a check valve 42 which allows the flow of the operating fluid from the hydraulic pressure modulator 9 toward the brake caliper 4.

The brake apparatus according to this embodiment is provided with a total of three hydraulic sensors. A first pressure sensor P1 and a second pressure sensor P2 are provided on the input side of the brake circuit with the third solenoid valve SOL3 being the boundary between the input side and the output side. A third pressure sensor P3 is provided on the output side of the brake circuit. The first pressure sensor P1 and the second pressure sensor P2 detect the operated amount of the brake operation member 3, while the third pressure sensor P3 on the output side detects the hydraulic pressure of the brake caliper 4 required for a feedback control of the motor 14.

More specifically, the first pressure sensor P1 is provided to the main pipe 30 between the master cylinder 2 and the third solenoid valve SOL3. The second pressure sensor P2 is provided to the first branch pipe 20 between the fluid loss simulator 6 and the first solenoid valve SOL1. Further, the third pressure sensor P3 is provided to the second branch pipe 40 between the hydraulic pressure modulator 9 and the second solenoid valve SOL2. This embodiment uses the second pressure sensor P2 which has a higher resolution and detection accuracy than the first pressure sensor P1 and the third pressure sensor P3.

Output signals from each of the first to third pressure sensors P1 to P3 is inputted to the ECU 50. Based on the output signals of the first pressure sensor P1, the second pressure sensor P2, the third pressure sensor P3 and the speed sensor 16, the ECU 50 is operated to perform opening/closing controls of the first solenoid valve SOL1, the second solenoid valve SOL2 and the third solenoid valve SOL3, as well as is operated to perform proper drive controls of the front and rear brakes of the motorcycle by performing the rotational drive of the motor 14.

It may be noted that, in this embodiment, the provision of two pressure sensors on the input side for detecting the brake operation force allows the brake control by the hydraulic pressure modulator 9 to be continued even when a failure, by any chance, occurs in either one of the pressure sensors. Also, the provision of the two pressure sensors on the input side allows the output values of the two sensors to be compared so that a failure diagnosis of the two sensors can be executed, even when the third solenoid valve SOL3 is closed to disconnect the input side and the output side.

Hereinafter, a description is given to illustrate an example of activating the brake circuit while the vehicle is stationary or being driven.

When the vehicle is stationary, the third solenoid valve SOL3 is in the opened state, the first solenoid valve SOL1 is in the closed state, and the second solenoid valve SOL2 is in the closed state. In other words, during a stop of the vehicle, the first to third solenoid valves SOL1 to SOL3 are in non-energized states.

When the vehicle is started to be driven from the stop state, the speed sensor 16 inputs the respective rotary speeds of the front and rear wheels to the ECU 50. Subsequently, the speed of the vehicle is calculate based on the higher rotary speed between the front and rear wheels. If the ECU 50 detects that the vehicle speed has reached a predetermined value (5 km/h, for example), the third solenoid valve SOL3 is energized to be switched to the closed state and the first solenoid valve SOL1 is switched to the opened state to be in a stand-by state. Accordingly, the master cylinder 2 and the fluid loss simulator 6 are connected. It may be noted that, in the stand-by state, the second solenoid valve SOL2 is in the closed state (non-energized state). The stand-by state is held until the brake operation is performed by the rider.

When the rider performs the brake in the stand-by state described above, the ECU 50 energizes the second solenoid valve SOL2 to connect the hydraulic pressure modulator 9 and the brake caliper 4 based on the output signal from the second pressure sensor P2, and drives the motor 14 to supply a predetermined hydraulic pressure to the brake caliper 4.

It may be noted that, the third solenoid valve SOL3 is closed while the hydraulic pressure is being supplied to the brake caliper 4 by the hydraulic pressure modulator 9, and thus the fluctuation of the hydraulic pressure due to the activation of the hydraulic pressure modulator 9 is not transmitted to the brake operation member 3.

Here, in the brake operation member 3, a brake operational feeling artificially reproduced in the fluid loss simulator 6 is generated. It may be noted that, at the time of the brake operation, the fluctuation of the hydraulic pressure of the hydraulic pressure modulator 9 is not transmitted to the brake operation member 3, whereby the operation reaction force accompanying the activation of the ABS is not generated.

As described above, with the brake apparatus for a vehicle according to this embodiment, the third solenoid valve SOL3 is closed and the first solenoid valve SOL1 is opened to be in the stand-by state when the vehicle reaches the predetermined speed. Therefore, the master cylinder 2 can be separated in advance from the hydraulic pressure modulator 9 and the brake caliper 4 while driving without the brake operation being performed. Accordingly, the operation stroke at the time of the brake operation can be stabilized.

As described above, the hydraulic pressure generated in the master cylinder 2 is not transmitted to the second pressure sensor P2 unless being switched to the stand-by state described above, to bring the first solenoid valve SOL1 to the opened state. In other words, even when a large operation force is applied to the brake operation member 3 while the vehicle is stationary and when an excessive hydraulic pressure is generated in the master cylinder 2, none of the hydraulic pressure is transmitted to the second pressure sensor P2. Thus, the second pressure sensor P2 can be protected even with a high resolution. Accordingly, the detection accuracy of the brake operation force in the stand-by state can be improved.

Further, in the configuration described above, when the detection accuracy of the second pressure sensor P2 is made higher than the first pressure sensor P1 and the third pressure sensor P3, the accuracy of a brake drive control can further be improved by executing the zero-point corrections of the respective pressure sensors, based on the output value of the second pressure sensor P2.

Hereinafter, the steps of the zero-point correction process of the first to third pressure sensors P1 to P3 are described with reference to FIGS. 2 to 6.

FIGS. 2 to 5 are operational illustrative views showing the steps of the zero-point correction process of the pressure sensor according to the illustrative embodiment of the present invention.

Figure 6:
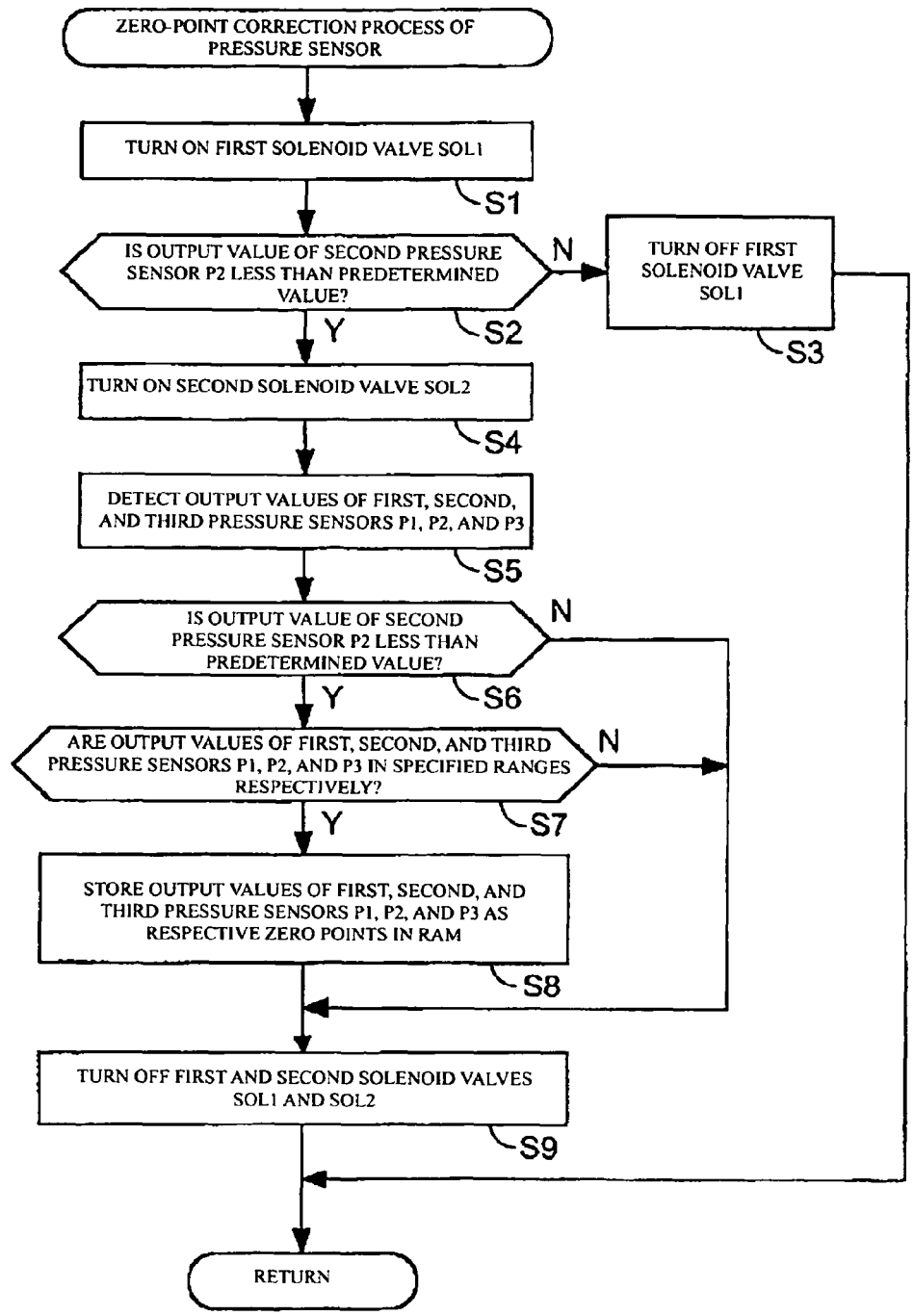
FIG. 6 is a flowchart showing steps of the zero-point correction process.

FIG. 6 is a flowchart showing the steps of the zero-point correction process according to this embodiment. If the zero-point correction process is set to be executed when the main power supply of the motorcycle is turned on, the respective pressure sensors are updated to optimal states every time the vehicle is used. It may be noted that the zero-point correction process may be executed when the brake operation is not performed, for example, during driving.

Figure 2:
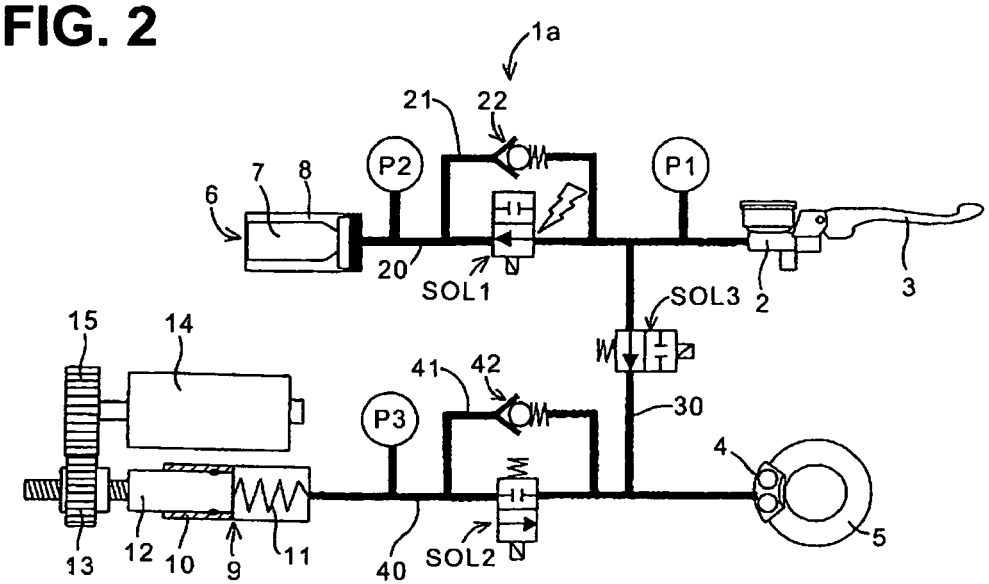
FIG. 2 is an operational illustrative view showing a step of a zero-point correction process (a first solenoid valve turned on).

Firstly, in step S1, the first solenoid valve SOL1 is turned on to be in the opened state (see FIG. 2). Subsequently, in step S2, it is determined whether the output value of the second pressure sensor P2 is less than (smaller than) a predetermined value. This predetermined value can be set to a value slightly greater than a minimum value which is possibly outputted when, for example, the brake operation is not performed, i.e., the hydraulic pressure of the main pipe 30 is zero. Accordingly, the high detection accuracy of the second pressure sensor P2 can be utilized to the fullest to improve the detection accuracy of the brake in the non-operated state.

When a positive determination is made in step S2, i.e., when it is determine that the output value of second pressure sensor P2 is less than a predetermined value, the process proceeds to step S4, whereby the second solenoid valve SOL2 is turned on to be in the opened state. Accordingly, the first solenoid valve SOL1 and the second solenoid valve SOL2 are both brought to the energized states (see FIG. 4).

On the other hand, when a negative determination is made in step S2, it is assumed that the brake operation has been performed at the time of execution of the zero-point correction process. Therefore, the process proceeds to step S3 to stop the drive of the first solenoid valve SOL1 and terminate a process sequence. Accordingly, the zero-point correction process is cancelled, and the second pressure sensor P2 is prevented from being supplied with an excessive hydraulic pressure while the first solenoid valve SOL1 is opened.

Figure 3:
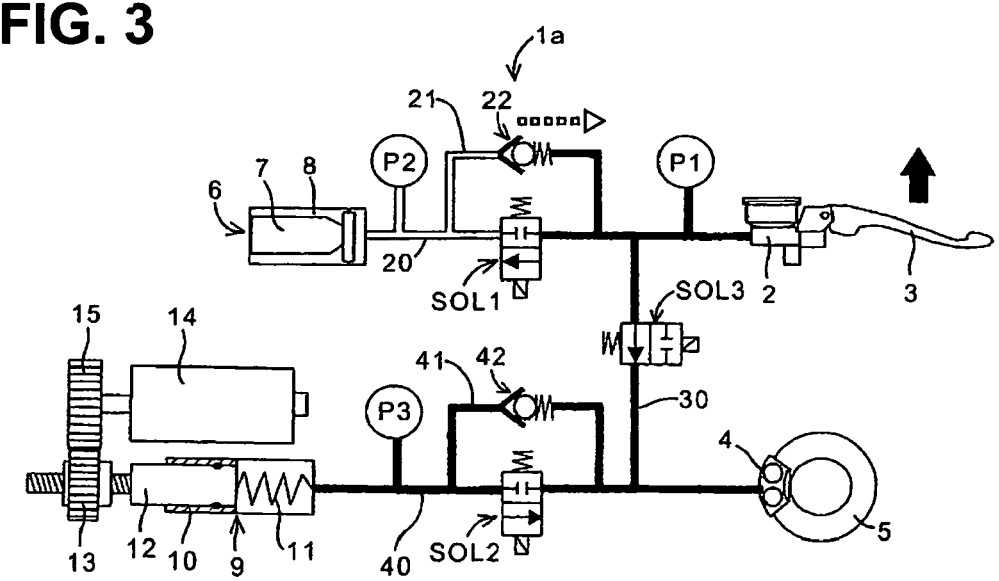
FIG. 3 is an operational illustrative view showing a step of the zero-point correction process (in which a brake lever released).
Figure 4:
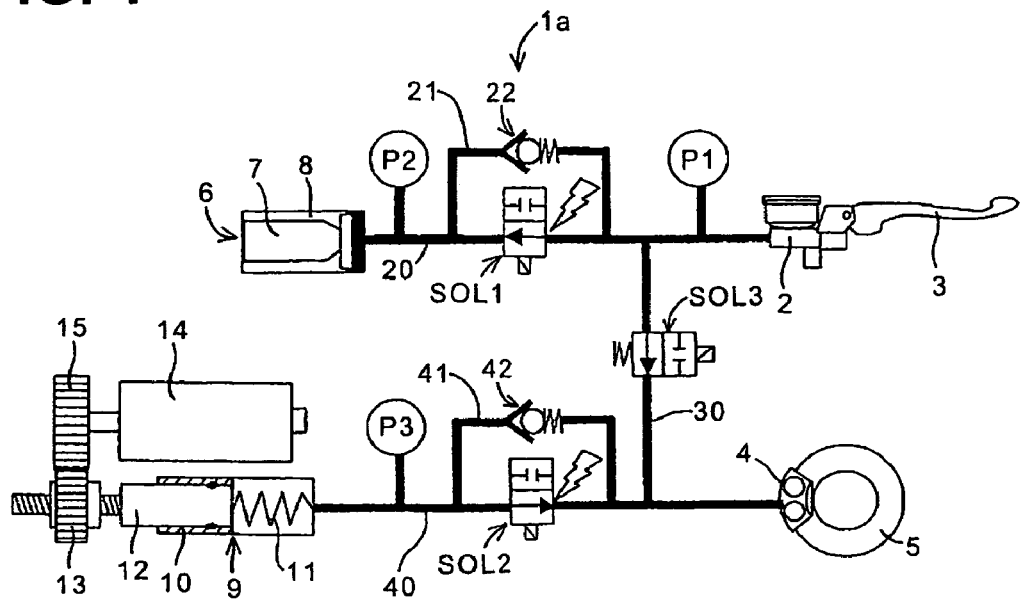
FIG. 4 is an operational illustrative view showing a step of the zero-point correction process (the first and a second solenoid valves turned on).
Figure 5:
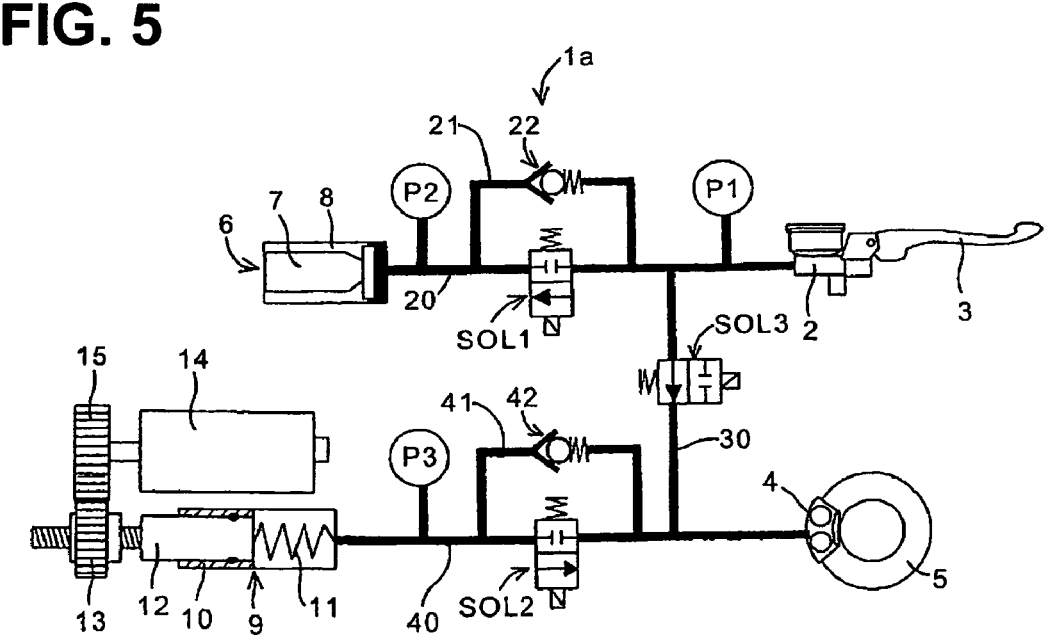
FIG. 5 is an operational illustrative view showing a step of the zero-point correction process (the first and second solenoid valves turned off).

As shown in FIG. 3, when the brake operation is cancelled to release the operation force applied to the brake operation member (brake lever) 3, the operating fluid passes through the check valve 22 to return to the master cylinder 2 side, whereby the hydraulic pressure in the first branch pipe 20 and the main pipe 30 returns to zero.

At this time, for example, the zero-point correction process may be restarted from step S1, when the output value of the first pressure sensor P1 provided between the master cylinder 2 and the third solenoid valve SOL3 is detected and the output value turns out to be less than or equal to a set value showing the non-opened state of the brake.

Returning to the flowchart (FIG. 6), the output values of the first through third pressure sensors P1 to P3 are detected in step S5. Next, in step S6, it is determined whether or not the output value of the second pressure sensor P2 is less (smaller) than the predetermined value. In the determination of step S6, the presence of the brake operation is re-determined.

When it is determined as negative, i.e., when it is determined that an output value of second pressure sensor P2 is less than a predetermined value, the process proceeds to step S9, in which the first solenoid valve SOL1 and the second solenoid valve SOL2 are turned off to cancel the zero-point correction process and terminate a control sequence. When it is determined as positive in step S6, the process proceeds to step S7.

In step S7, it is determined whether or not the output values of the first to third pressure sensors P1 to P3 are respectively within specified ranges. The specified ranges can be set, for example, as ranges in which the accuracy errors of the respective pressure sensors are absorbed. Accordingly, it is possible to determine whether the respective sensors are functioning normally can be determined, to detect whether an unexpected hydraulic pressure is generated in the brake circuit where the hydraulic pressure is supposed to be zero, and the like.

When it is determined as positive in step S7, i.e., when it is determined that output values of first through third pressure sensors P1 to P3 are in the specified range, the process proceeds to step S8, whereby the respective output values of the first to third pressure sensors P1 to P3 are stored in a RAM as zero points of the respective pressure sensors.

Accordingly, the zero-point correction process of the first to third pressure sensors P1 to P3 with the output value of the second pressure sensor P2 as the reference is completed. In step S9, the first solenoid valve SOL1 and the second solenoid valve SOL2 are turned off to terminate the control sequence. It may be noted that the RAM as a temporary storage device mounted in the ECU 50 is supplied with electric power from an on-vehicle power supply even if the power source of the vehicle is turned off. Thus, the corrected content is held until the next zero-point correction process is executed.

As described above, with the brake apparatus for a vehicle according to the present invention, the brake apparatus of the by-wire system, in which the hydraulic pressure generated in the master cylinder accompanying the brake operation of the rider is detected by the predetermined pressure sensor and the hydraulic modulator is driven to supply the hydraulic pressure to the brake caliper based on the detected value, is configured such that the hydraulic pressure generated in the master cylinder is not inputted to the predetermined pressure sensor unless the predetermined normally closed solenoid valve is opened.

Accordingly, the predetermined pressure sensor can be protected even if an excessive hydraulic pressure is generated in the master cylinder as long as the predetermined solenoid valve is in the closed state. This allows the resolution of the predetermined pressure sensor to be improved, and thus the detection accuracy of the hydraulic pressure generated in the master cylinder can be improved. By performing the zero-point correction of another pressure sensor with the output value of the pressure sensor having the high detection accuracy as the reference, the accuracy of the zero-point correction can be improved.

It may be noted that, the configurations of the brake operation member, the master cylinder, the fluid loss simulator, the hydraulic modulator, the first to third solenoid valves, and the first to third pressure sensors, the settings of the resolutions of the respective pressure sensors, and the like are not limited to the embodiment described above, and various modifications are possible.

For example, the hydraulic modulator may be configured such that a hydraulic piston is pressed by a swingable actuator. The brake apparatus according to the present invention is not limited to the motorcycle described above, and may be applied to various vehicles such as a three-wheeled vehicle or a four-wheeled vehicle.

In other words, although the present invention is described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A brake apparatus for a vehicle, comprising:
a master cylinder for generating hydraulic pressure according to a brake operation force applied by an operator of said vehicle;
a main pipe;
a brake caliper which is operatively connected with the master cylinder via said main pipe;
a fluid loss simulator which is operatively connected to an end section portion of a first branch pipe branched from the main pipe;
a first solenoid valve which is normally closed, and which is disposed in a middle portion of the first branch pipe; said first solenoid valve being operable to selectively connect or disconnect the master cylinder with the fluid loss simulator;
a hydraulic modulator which is connected to an end portion of a second branch pipe branched from the main pipe on a brake caliper side with respect to the first branch pipe; said hydraulic modulator being operable to apply hydraulic pressure, generated by a driving force of an actuator, to the brake caliper;
a second solenoid valve which is normally closed, and which is disposed in a middle portion of the second branch pipe; said second solenoid valve being operable to selectively connect or disconnect the hydraulic modulator with the brake caliper;
a third solenoid valve which is normally open, and which is disposed in a middle portion of the main pipe; said third solenoid valve being operable to selectively connect or disconnect the master cylinder with the brake caliper;
a first pressure sensor disposed on the main pipe between the master cylinder and the third solenoid valve;
a second pressure sensor disposed on the first branch pipe between the first solenoid valve and the fluid loss simulator;
a third pressure sensor disposed on the second branch pipe between the second solenoid valve and the hydraulic modulator; and
a control unit for detecting output values of the first, second, and third pressure sensors;
wherein a resolution of the second pressure sensor is set a higher value than resolutions of the first and third pressure sensors;
wherein the control unit is operable to energize and thereby open the first solenoid valve, and to detect the output value from the second pressure sensor; and
wherein when the output value of the second pressure sensor is less than a predetermined value, the control unit executes a zero-point correction by storing respective detected output values from the first, second, and third pressure sensors as zero points for the first, second and third pressure sensors, respectively.

2. The brake apparatus for a vehicle according to claim 1, wherein when the detected output value of the second pressure sensor is greater than or equal to the predetermined value, the control unit is operated to close the first solenoid valve.

3. The brake apparatus for a vehicle according to claim 1, wherein the zero-point correction is executed when a main power supply of the vehicle is turned on.

4. The brake apparatus for a vehicle according to claim 2, wherein the zero-point correction is executed when a main power supply of the vehicle is turned on.

5. The brake apparatus for a vehicle according to claim 1, wherein the vehicle is a motorcycle having front and rear wheels; and
wherein said brake apparatus is provided separately and independently for each of the front and rear wheels of the motorcycle.

6. The brake apparatus for a vehicle according to claim 2, wherein the vehicle is a motorcycle having front and rear wheels; and wherein said brake apparatus is provided separately and independently for each of the front and rear wheels of the motorcycle.

7. The brake apparatus for a vehicle according to claim 3, wherein the vehicle is a motorcycle having front and rear wheels; and
wherein said brake apparatus is provided separately and independently for each of the front and rear wheels of the motorcycle.

8. The brake apparatus for a vehicle according to claim 4, wherein the vehicle is a motorcycle having front and rear wheels; and
wherein said brake apparatus is provided separately and independently for each of the front and rear wheels of the motorcycle.

9. A brake apparatus for a vehicle comprising:
a master cylinder for generating hydraulic pressure according to a brake operation force applied by an operator of said vehicle;
a main pipe having a first branch pipe and a second branch pipe each branched therefrom;
a brake caliper operatively connected with the master cylinder via said main pipe;
a fluid loss simulator operatively connected to an end portion of the first branch pipe;
a first solenoid valve which is normally closed, and which is disposed in a middle portion of the first branch pipe; said first solenoid valve being operable to selectively connect the master cylinder with the fluid loss simulator;
a hydraulic modulator operatively connected to an end portion of said second branch pipe on a brake caliper side with respect to the first branch pipe; said hydraulic modulator being operable to apply hydraulic pressure, generated by a driving force of an actuator, to the brake caliper;
a second solenoid valve which is normally closed, and which is disposed in a middle portion of the second branch pipe; said second solenoid valve being operable to selectively connect the hydraulic modulator with said the brake caliper;
a third solenoid valve which is normally open, and which disposed in a middle portion of the main pipe; said third solenoid valve being operable to selectively connect the master cylinder with the brake caliper;
a first pressure sensor disposed on said main pipe between the master cylinder and the third solenoid valve;
a second pressure sensor disposed on the first branch pipe between the first solenoid valve and the fluid loss simulator;
a third pressure sensor disposed on the second branch pipe between the second solenoid valve and the hydraulic modulator; and
a control unit for detecting output values of the first, second, and third pressure sensors;
wherein a resolution of the second pressure sensor is set at a higher value than resolutions of the first and third pressure sensors;
wherein the control unit is operable to energize the first solenoid valve to an opened state, and to detect the output value of the second pressure sensor; and
wherein when the output value of the second pressure sensor is less than a predetermined value, the control unit executes a zero-point correction by storing respective detected output values of the first, second, and third pressure sensors as reference points for the first, second and third pressure sensors, respectively.

10. A brake apparatus for a vehicle according to claim 9, wherein when the detected output value of the second pressure sensor is greater than or equal to the predetermined value, the control unit is operated to close the first solenoid valve.

11. A brake apparatus for a vehicle according to claim 9, wherein the zero-point correction is executed when a main power supply of the vehicle is turned on.

12. A brake apparatus for a vehicle according to claim 10, wherein the zero-point correction is executed when a main power supply of the vehicle is turned on.

13. A brake apparatus for a vehicle according to claim 9, wherein the vehicle is a motorcycle; and
wherein the brake apparatus is provided separately and independently to each of front and rear wheels of the motorcycle.

14. A brake apparatus for a vehicle according to claim 10, wherein the vehicle is a motorcycle; and
wherein the brake apparatus is provided separately and independently for each front and rear wheels of the motorcycle.

15. A brake apparatus for a vehicle according to claim 11, wherein the vehicle is a motorcycle; and
wherein the brake apparatus is provided separately and independently for each of front and rear wheels of the motorcycle.

16. A method of establishing reference values for multiple pressure sensors of a brake apparatus of a motorcycle;
said brake apparatus comprising:
a master cylinder for generating hydraulic pressure according to a brake operation force applied by an operator of the vehicle;
a main pipe having a first branch pipe and a second branch pipe each branched therefrom;
a brake caliper connected with the master cylinder via said main pipe;
a fluid loss simulator connected to an end portion of the first branch pipe;
a first solenoid valve which is normally closed, and which is disposed in a middle portion of the first branch pipe; said first solenoid valve being operable to selectively connect the master cylinder with the fluid loss simulator;
a hydraulic modulator operatively connected to an end portion of said second branch pipe on a brake caliper side with respect to the first branch pipe; said hydraulic modulator being operable to apply hydraulic pressure, generated by a driving force of an actuator, to the brake caliper;
a second solenoid valve which is normally closed, and which is disposed in a middle portion of the second branch pipe; said second solenoid valve being operable to selectively connect the hydraulic modulator with said the brake caliper;
a third solenoid valve which is normally open, and which is disposed in a middle portion of the main pipe; said third solenoid valve being operable to selectively connect the master cylinder with the brake caliper;
a first pressure sensor disposed on said main pipe between the master cylinder and the third solenoid valve;
a second pressure sensor disposed on the first branch pipe between the first solenoid valve and the fluid loss simulator;
a third pressure sensor disposed on the second branch pipe between the second solenoid valve and the hydraulic modulator; and a control unit for detecting output values of the first, second, and third pressure sensors;
wherein a resolution of the second pressure sensor is set at a higher value than resolutions of the first and third pressure sensors;
said method comprising the steps of
energizing the first solenoid valve by the control unit to place the valve into an opened state;
detecting an output value of the second pressure sensor;
when the detected output value of the second pressure sensor is less than a predetermined value, executing a zero-point correction by storing detected output values of the first, second, and third pressure sensors as reference values for said first, second and third sensors, respectively.

17. A method of establishing reference values for multiple pressure sensors of a brake apparatus of a motorcycle according to claim 16, further comprising the step of, when the detected output value of the second pressure sensor is greater than or equal to the predetermined value, de-engergizing the first solenoid valve to close said first solenoid valve.

18. A method of establishing reference values for multiple pressure sensors of a brake apparatus of a motorcycle according to claim 16, wherein said method is executed when a main power supply of the vehicle is turned on.

19. A method of establishing reference values for multiple pressure sensors of a brake apparatus of a motorcycle according to claim 17, wherein said method is executed when a main power supply of the vehicle is turned on.

20. A method of establishing reference values for multiple pressure sensors of a brake apparatus of a motorcycle according to claim 16, wherein the brake apparatus is provided separately and independently for each of front and rear wheels of the motorcycle.

* * * * *